US011584256B2

(12) United States Patent
Kawai et al.

(10) Patent No.: US 11,584,256 B2
(45) Date of Patent: Feb. 21, 2023

(54) VEHICLE CONTROL DEVICE, CONTROL METHOD, NON-TRANSITORY STORAGE MEDIUM, AND VEHICLE

(71) Applicant: TOYOTA JIDOSHA KABUSHIKI KAISHA, Toyota (JP)

(72) Inventors: Toshihiro Kawai, Okazaki (JP); Shinichi Inoue, Okazaki (JP); Toru Ono, Toyota (JP); Yasushi Kusaka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/363,720

(22) Filed: Jun. 30, 2021

(65) Prior Publication Data

US 2022/0009376 A1 Jan. 13, 2022

(30) Foreign Application Priority Data

Jul. 7, 2020 (JP) .............................. JP2020-117159

(51) Int. Cl.
*B60L 58/18* (2019.01)
*B60L 50/60* (2019.01)
*B60L 58/12* (2019.01)
*H02J 7/00* (2006.01)
*B60L 1/00* (2006.01)

(52) U.S. Cl.
CPC ................. *B60L 58/18* (2019.02); *B60L 1/00* (2013.01); *B60L 50/66* (2019.02); *B60L 58/12* (2019.02); *H02J 7/0048* (2020.01); *B60L 2210/10* (2013.01); *B60L 2240/54* (2013.01)

(58) Field of Classification Search
CPC .......... B60L 58/18; B60L 50/66; B60L 58/12; B60L 1/00; B60L 2210/10; B60L 2240/54; H02J 7/0048
See application file for complete search history.

(56) References Cited

U.S. PATENT DOCUMENTS

| 2016/0006059 | A1* | 1/2016 | Kwon ..................... B60L 58/40 |
| | | | 429/442 |
| 2017/0217318 | A1* | 8/2017 | Kowalewski ........... B60L 58/20 |
| 2019/0359079 | A1 | 11/2019 | Mitsutani et al. |
| 2022/0085641 | A1* | 3/2022 | Hirota ................... H02M 7/219 |

FOREIGN PATENT DOCUMENTS

JP 2019-205275 A 11/2019

* cited by examiner

*Primary Examiner* — Jared Fureman
*Assistant Examiner* — Duc M Pham
(74) *Attorney, Agent, or Firm* — Oblon, McClelland, Maier & Neustadt, L.L.P.

(57) ABSTRACT

A vehicle control device for a vehicle includes a processor. The vehicle includes a first battery, a second battery, an auxiliary load powered by the second battery, and a DC-to-DC converter configured to supply electric power from the first battery to either the second battery or the auxiliary load, or to both of the second battery or the auxiliary load. The processor is configured to: determine the state of a start switch and the boarding state of the vehicle; acquire the voltage of the second battery; and when the processor determines that the vehicle is in a non-started on-board state, determine based on the voltage of the second battery an order in which the DC-to-DC converter and the auxiliary load are driven. The non-started on-board state is a state in which the start switch is off and a user is presumed to be in the vehicle.

8 Claims, 5 Drawing Sheets

VEHICLE CONTROL DEVICE, CONTROL METHOD, NON-TRANSITORY STORAGE MEDIUM, AND VEHICLE

CROSS-REFERENCE TO RELATED APPLICATION

This application claims priority to Japanese Patent Application No. 2020-117159 filed on Jul. 7, 2020, incorporated herein by reference in its entirety.

BACKGROUND

1. Technical Field

The present disclosure relates to vehicle control devices that are mounted on vehicles, methods, non-transitory storage mediums, and vehicles.

2. Description of Related Art

Japanese Unexamined Patent Application Publication No. 2019-205275 (JP 2019-205275 A) discloses a power supply device that supplies electric power from a high-voltage battery to an auxiliary battery when a start switch is in an off state in which a vehicle is not traveling such as when an occupant gets out of or into the vehicle. The high-voltage battery supplies electric power to in-vehicle devices called main devices such as an electric motor, and the auxiliary battery supplies electric power to in-vehicle devices (auxiliary loads) called auxiliaries such as electronic mirrors and a boarding assist device.

In the power supply device described in JP 2019-205275 A, when power consumption of the auxiliary load is larger than a predetermined value, a direct current to direct current (DC-to-DC) converter is driven to supply electric power from the high-voltage battery to the auxiliary load.

SUMMARY

The relationship between the timing of driving the DC-to-DC converter and the timing of driving the auxiliary load is not considered in the power supply device described in JP 2019-205275 A. Therefore, the auxiliary load may not be driven if the process of driving the auxiliary load is performed before the process of driving the DC-to-DC converter when the auxiliary battery is in such a state (state of charge or voltage) that the auxiliary battery cannot supply electric power required to drive the auxiliary load.

The present disclosure provides a vehicle control device capable of reliably driving an auxiliary load in the state in which a start switch of a vehicle is off and a user is presumed to be in the vehicle.

The vehicle control device according to the first aspect of the present disclosure is mounted on a vehicle. The vehicle includes a first battery, a second battery, an auxiliary load that is powered by the second battery, and a DC-to-DC converter configured to supply electric power from the first battery to either or both of the second battery and the auxiliary load. The vehicle control device includes a processor. The processor is configured to control operation of the DC-to-DC converter and operation of the auxiliary load. The processor is configured to determine a state of a start switch of the vehicle and a boarding state of the vehicle. The processor is configured to acquire a voltage of the second battery. The processor is configured to, when the processor determines that the vehicle is in a non-started on-board state, determine based on the voltage of the second battery an order in which the DC-to-DC converter and the auxiliary load are driven. The non-started on-board state is a state in which the start switch is off and a user is presumed to be in the vehicle.

In the vehicle control device according to the first aspect of the present disclosure, the processor may be configured to derive a state of charge of the second battery based on the voltage of the second battery. The processor may be configured to, in the non-started on-board state, drive the auxiliary load and then drive the DC-to-DC converter when the state of charge is equal to or higher than a first threshold, and drive the DC-to-DC converter and then drive the auxiliary load when the state of charge is lower than the first threshold. In the vehicle control device according to the first aspect of the present disclosure, the processor may be configured to derive internal resistance of the second battery based on the voltage of the second battery and a temperature of the second battery. The processor may be configured to derive an estimated reduced voltage based on the voltage of the second battery, the internal resistance of the second battery, and estimated current consumption of the auxiliary load, the estimated reduced voltage being a voltage of the second battery after a first period in the non-started on-board state, and the estimated current consumption being a current estimated to be consumed by the auxiliary load during the first period in the non-started on-board state. The processor may be configured to, in the non-started on-board state, drive the auxiliary load and then drive the DC-to-DC converter when the estimated reduced voltage is equal to or higher than a second threshold, and drive the DC-to-DC converter and then drive the auxiliary load when the estimated reduced voltage is lower than the second threshold.

In the vehicle control device according to the first aspect of the present disclosure, the processor may be configured to derive the internal resistance of the second battery based on both the state of charge of the second battery obtained based on the voltage of the second battery and the temperature of the second battery. In the vehicle control device according to the first aspect of the present disclosure, the processor may be configured to derive the estimated reduced voltage by subtracting a voltage drop from the voltage of the second battery immediately after the processor determines that the vehicle is in the non-started on-board state, the voltage drop being calculated by multiplying the internal resistance of the second battery and the estimated current consumption. In the vehicle control device according to the first aspect of the present disclosure, the processor may be configured to control a relay to a connected state before driving the DC-to-DC converter, the relay being configured to switch an electrical conduction state between the first battery and the DC-to-DC converter.

A vehicle control method according to a second aspect of the present disclosure is performed by a computer of a vehicle control device mounted on a vehicle. The vehicle includes a first battery, a second battery, an auxiliary load that is powered by the second battery, and a DC-to-DC converter configured to supply electric power from the first battery to either or both of the second battery and the auxiliary load. The control method includes: determining a state of a start switch of the vehicle and a boarding state of the vehicle; acquiring a voltage of the second battery; and when determination is made that the vehicle is in a non-started on-board state, determining based on the voltage of the second battery an order in which the DC-to-DC converter and the auxiliary load are driven, the non-started on-board state being a state in which the start switch is off and a user is presumed to be in the vehicle.

A non-transitory storage medium according to a third aspect of the present disclosure stores instructions that are executable by a processor of a vehicle control device mounted on a vehicle and that cause the processor to perform functions. The vehicle includes a first battery, a second battery, an auxiliary load that is powered by the second battery, and a DC-to-DC converter configured to supply electric power from the first battery to either or both of the second battery and the auxiliary load. The functions include: determining a state of a start switch of the vehicle and a boarding state of the vehicle; acquiring a voltage of the second battery; and when determination is made that the vehicle is in a non-started on-board state, determining based on the voltage of the second battery an order in which the DC-to-DC converter and the auxiliary load are driven, the non-started on-board state being a state in which the start switch is off and a user is presumed to be in the vehicle.

According to the present disclosure, when the start switch of the vehicle is off and a user is presumed to be in the vehicle, which of the auxiliary load and the DC-to-DC converter should be driven first is determined based on the voltage of the auxiliary battery. The auxiliary load can thus be driven reliably.

BRIEF DESCRIPTION OF THE DRAWINGS

Features, advantages, and technical and industrial significance of exemplary embodiments of the invention will be described below with reference to the accompanying drawings, in which like signs denote like elements, and wherein.

DETAILED DESCRIPTION OF EMBODIMENTS

In a vehicle control device of the present disclosure, when a user is presumed to be on board and an ignition of the vehicle is off, a DC-to-DC converter is preferentially driven over an auxiliary load unless the state of an auxiliary battery satisfies conditions required to driving the auxiliary load. Electric power that is supplied to drive the auxiliary load can thus be provided by a high-voltage battery via the DC-to-DC converter. The auxiliary load can therefore be driven reliably. An embodiment of the present disclosure will be described in detail with reference to the drawings.

Configuration

Figure 1:
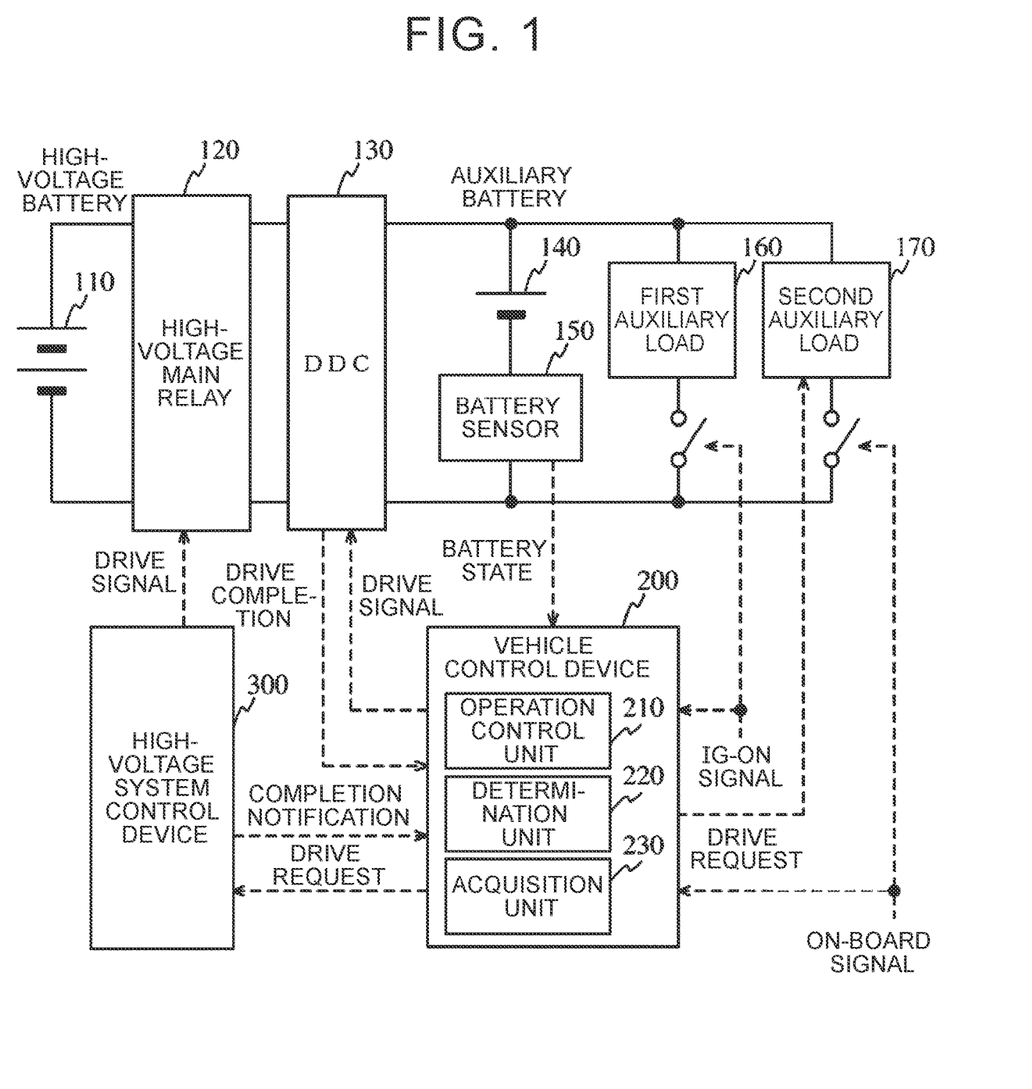
FIG. 1 is a functional block diagram of a vehicle control device and its peripheral components according to an embodiment.

FIG. 1 is a functional block diagram of a vehicle control device 200 and its peripheral components according to an embodiment of the present disclosure. The functional block illustrated in FIG. 1 includes a high-voltage battery 110, a high-voltage main relay 120, a DC-to-DC converter (DDC) 130, an auxiliary battery 140, a battery sensor 150, a first auxiliary load 160, a second auxiliary load 170, a vehicle control device 200, and a high-voltage system control device 300. In FIG. 1, signal lines for electric power are shown by continuous lines, and signal lines for control and communication are shown by dashed lines.

The high-voltage battery 110 is a rechargeable secondary battery such as a lithium ion battery and is a battery (first battery) that is related to traveling of the vehicle and that supplies electric power to a high-voltage system including what is called a main device (not shown) mounted on a vehicle such as, e.g., a traction electric motor. The high-voltage battery 110 is connected to the DC-to-DC converter 130 via the high-voltage main relay 120. Switching of the high-voltage main relay 120 between a connected state and a disconnected state (the electrical conduction state of the high-voltage main relay 120) is controlled by the high-voltage system control device 300. The high-voltage battery 110 can supply electric power to the DC-to-DC converter 130 when the high-voltage main relay 120 is in the connected state.

The DC-to-DC converter 130 connects the high-voltage battery 110 to the auxiliary battery 140, the first auxiliary load 160, and the second auxiliary load 170 via the high-voltage main relay 120. The DC-to-DC converter 130 can supply electric power stored in the high-voltage battery 110 to a part of the auxiliary battery 140, the first auxiliary load 160, and the second auxiliary load 170 (e.g., only the auxiliary battery 140) or all of the auxiliary battery 140, the first auxiliary load 160, and the second auxiliary load 170, as controlled by the vehicle control device 200. When supplying electric power, the DC-to-DC converter 130 can convert (steps down) a high voltage of the high-voltage battery 110, namely an input voltage, to a predetermined low voltage specified by the auxiliary battery 140 or a low voltage required for the first auxiliary load 160 and the second auxiliary load 170, according to a voltage instruction value from the vehicle control device 200, and output the low voltage.

The auxiliary battery 140 is a rechargeable secondary battery such as a lead-acid battery or a lithium-ion battery and is a battery (second battery) that serves as a power source for supplying electric power to an auxiliary system including the first auxiliary load 160 and the second auxiliary load 170. The rated voltage of the auxiliary battery 140 is typically set to be lower than that of the high-voltage battery 110. The battery state of the auxiliary battery 140 is monitored by the battery sensor 150. The battery sensor 150 of the present embodiment includes at least a current sensor that detects a current flowing into the auxiliary battery 140 and a current flowing out of the auxiliary battery 140, a voltage sensor that detects a terminal voltage of the auxiliary battery 140, and a temperature sensor that detects the temperature of the auxiliary battery 140. The battery state (current value, voltage value, and temperature value) detected by the battery sensor 150 is output to the vehicle control device 200 as needed.

The first auxiliary load 160 and the second auxiliary load 170 are what are called auxiliaries mounted on the vehicle, such as, e.g., electronic mirrors and a boarding assist device, and are loads that consume electric power required to perform a predetermined operation. The first auxiliary load 160 and the second auxiliary load 170 operate with the electric power supplied from the high-voltage battery 110 via the DC-to-DC converter 130 or the electric power stored in the auxiliary battery 140, in response to an IG-ON signal or an on-board signal that will be described later.

In the present embodiment, the first auxiliary load 160 is an auxiliary load that operates when an ignition is on (in response to an IG-ON signal). The ignition is a start switch of the vehicle. The second auxiliary load 170 is an auxiliary load that operates when it is presumed that there is an occupant such as a driver or a passenger (hereinafter referred to as a "user") in the vehicle (in response to an on-board signal), regardless of whether the ignition is on or off. The operation of driving or stopping the second auxiliary load 170 is controlled based on a drive request received from the vehicle control device 200.

Although FIG. 1 illustrates an example in which a single first auxiliary load 160 and a single second auxiliary load 170 are mounted on the vehicle, two or more first auxiliary loads 160 and two or more second auxiliary loads 170 may be mounted on the vehicle.

The vehicle control device 200 is a device capable of managing a power supply for the vehicle that uses the high-voltage battery 110 and the auxiliary battery 140. The vehicle control device 200 of the present embodiment suitably controls the DC-to-DC converter 130 to control driving of the second auxiliary load 170, particularly when the ignition of the vehicle is off. The vehicle control device 200 includes an operation control unit 210, a determination unit 220, and an acquisition unit 230.

The operation control unit 210 is a configuration for controlling the operation of the DC-to-DC converter 130. Specifically, the operation control unit 210 outputs to the DC-to-DC converter 130 a drive signal including a voltage instruction value indicating an output voltage value of the DC-to-DC converter 130. The DC-to-DC converter 130 driven in response to the drive signal notifies the operation control unit 210 that driving based on the voltage instruction value is completed. The operation control unit 210 can request to drive or stop the high-voltage system control device 300. The operation control unit 210 can request to drive or stop the second auxiliary load 170.

The determination unit 220 is a configuration for determining whether a user is presumed to be in the vehicle, that is, whether a user is presumed to be on board, and whether the ignition of the vehicle is off. Whether a user is on board is typically determined based on whether an on-board signal has been input to the vehicle control device 200. The on-board signal is generated when a specific operation that allows to presume that a user is on board is performed. Examples of the specific operation include a series of door operations in which a vehicle door is opened and then closed and an operation of locking or unlocking the vehicle door. The determination unit 220 may determine that a user is on board by a method other than checking the on-board signal generated based on the specific operation (seat sensor, driver's camera, etc.). Whether the ignition of the vehicle is off is typically determined based on whether an IG-ON signal has been input to the vehicle control device 200. The IG-ON signal is output when the ignition is on. The determination unit 220 may determine that the ignition is off by a method other than checking the IG-ON signal.

The acquisition unit 230 is a configuration for acquiring information about the charging state of the auxiliary battery 140. The acquisition unit 230 acquires the battery state (current value, voltage value, and temperature value) from the auxiliary battery 140. Specifically, when performing first control that will be described later, the acquisition unit 230 acquires a voltage value from the auxiliary battery 140 as the battery state. The acquisition unit 230 then derives the state of charge (SOC) of the auxiliary battery 140 based on the acquired battery state. When performing second control that will be described later, the acquisition unit 230 acquires a current value, a voltage value, and a temperature value from the auxiliary battery 140 as the battery state. The acquisition unit 230 then derives the internal resistance of the auxiliary battery 140 and a reduced voltage (estimated reduced voltage) of the auxiliary battery 140 that is estimated to result from power consumption of the second auxiliary load 170, based on the acquired battery state. How to derive the state of charge, the internal resistance, and the estimated reduced voltage will be described later.

The vehicle control device 200 can be composed of either a part of an electronic control unit (ECU) typically including a processor, a memory, an input and output interface, etc. or the entire electronic control unit. The electronic control unit includes an ECU that can control switching of the high-voltage main relay 120 between the connected state and the disconnected state, an ECU that can control the output voltage value of the DC-to-DC converter 130, an ECU that can monitor the state of the auxiliary battery 140, etc. The vehicle control device 200 implements the above functions by reading and executing programs stored in the memory by the processor.

The high-voltage system control device 300 controls switching of the high-voltage main relay 120 between the connected state and the disconnected state. This switching of the high-voltage main relay 120 is controlled by whether a drive signal for switching the high-voltage main relay 120 to the connected state is output to the high-voltage main relay 120. The high-voltage system control device 300 can control driving and stopping of the high-voltage system control device 300 itself based on a request from the vehicle control device 200. The high-voltage system control device 300 notifies the vehicle control device 200 that control of driving or stopping the high-voltage system control device 300 based on the request is completed. The high-voltage system control device 300 is configured to run on the auxiliary battery 140.

Control

Control that is performed by the vehicle control device 200 according to the embodiment of the present disclosure will be described with reference to FIGS. 2 to 7.

(1) First Control

Figure 2:
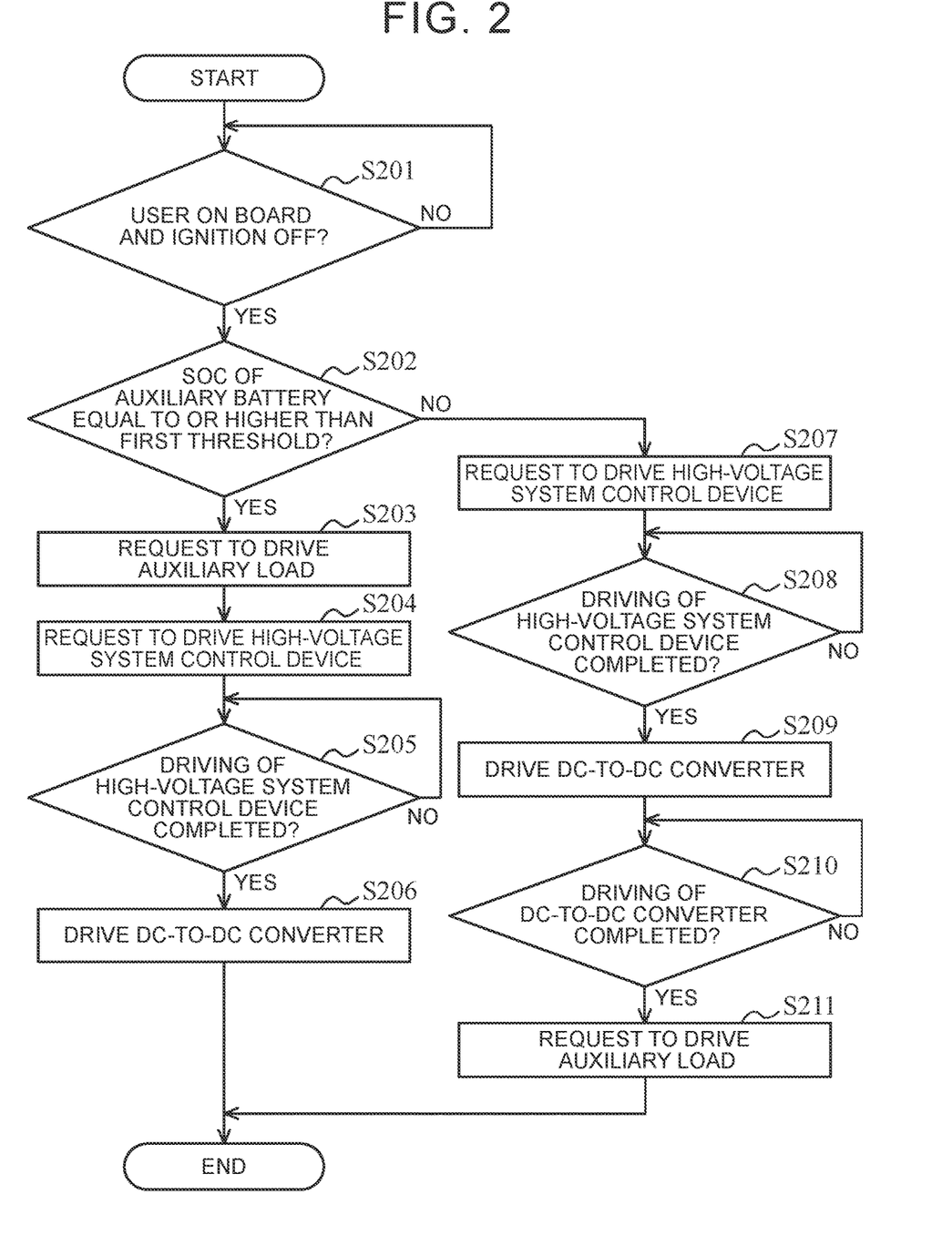
FIG. 2 is a flowchart of a process of first control that is performed by each configuration of the vehicle control device.
Figure 3:
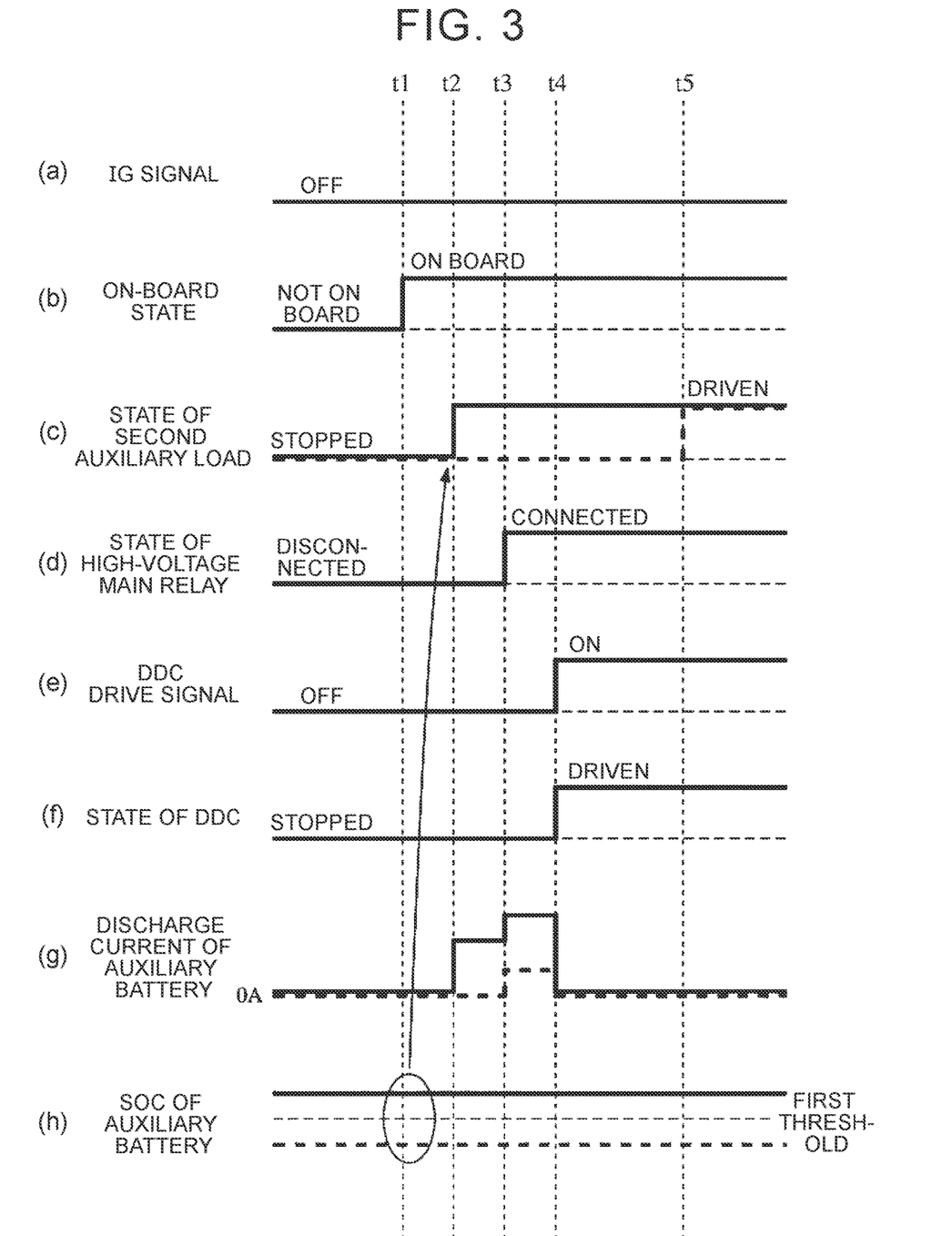
FIG. 3 illustrates an example of the operation timing based on the first control when an occupant gets in a vehicle.

FIG. 2 is a flowchart of a process of the first control that is performed by each configuration of the vehicle control device 200. FIG. 3 illustrates an example of the operation timing of each configuration based on the first control. FIG. 3 is an example when a user gets in the vehicle and illustrates control that is performed in the case where the user does not turn on the ignition of the vehicle immediately after he or she gets into the vehicle with the ignition off.

Step S201

The determination unit 220 determines whether a user is presumed to be on board and whether the ignition is off (non-started on-board state). When a user gets in the vehicle, it can be presumed that the user is on board when, for example, a series of door operations is performed in which a vehicle door is opened and then closed after the vehicle door is unlocked. It can be checked that the ignition is off by the presence or absence of the IG-ON signal. When the vehicle is in the non-started on-board state in which a user is presumed to be on board and the ignition is off (step S201, YES), the routine proceeds to step S202. Otherwise (step S201, NO), step S201 is repeated.

Step S202

The acquisition unit 230 determines whether the state of charge (SOC) of the auxiliary battery 140 derived from the voltage value of the auxiliary battery 140 received from the battery sensor 150 is equal to or higher than a first threshold. The first threshold is set based on the power required to drive the second auxiliary load 170. More specifically, the first threshold is set to any desired value equal to or larger than a state of charge that is high enough for the auxiliary battery 140 alone to be able to supply electric power to be consumed by the second auxiliary load 170 until the DC-to-DC converter 130 is driven and electric power is supplied from the high-voltage battery 110. The state of charge of the auxiliary battery 140 can be derived by a well-known method using state of charge-open circuit voltage (SOC-OCV) characteristics etc. When the state of charge of the auxiliary battery 140 is equal to or higher than the first threshold (at t1, continuous line in (h) of FIG. 3) (step S202, YES), the routine proceeds to step S203. When the state of charge of the auxiliary battery 140 is lower than the first threshold (at t1, thick dashed line in (h) of FIG. 3) (step S202, NO), the routine proceeds to step S207.

Step S203

The operation control unit 210 requests to drive the second auxiliary load 170. This request can be made by outputting a drive request signal to the second auxiliary load 170. Driving of the second auxiliary load 170 is started in response to this request (at t2, continuous line in (c) of FIG. 3). Driving of the second auxiliary load 170 causes a discharge current that flows out of the auxiliary battery 140 (at t2 to t3, continuous line in (g) of FIG. 3). When driving of the second auxiliary load 170 is requested, the routine proceeds to step S204.

Step S204

The operation control unit 210 requests to drive the high-voltage system control device 300. This request can be made by outputting a drive request signal to the high-voltage system control device 300. In response to this request, driving of the high-voltage system control device 300 is started and the high-voltage main relay 120 is switched to the connected state, namely an electrically conductive state (at t3, (d) of FIG. 3). Driving of the high-voltage system control device 300 increases the discharge current flowing out of the auxiliary battery 140 (at t3 to t4, continuous line in (g) of FIG. 3). When driving of the high-voltage system control device 300 is requested, the routine proceeds to step S205.

Step S205

The operation control unit 210 determines whether driving of the high-voltage system control device 300 is completed. This determination can be made by receiving a drive completion signal returned from the high-voltage system control device 300 in response to the drive request signal. When driving of the high-voltage system control device 300 is completed (step S205, YES), the routine proceeds to step S206. Otherwise (step S205, NO), step S205 is repeated.

Step S206

The operation control unit 210 drives the DC-to-DC converter (DDC) 130. Specifically, the operation control unit 210 outputs to the DC-to-DC converter 130 a drive signal with a set voltage instruction value that allows supply of electric power to the second auxiliary load 170 (at t4, (e) of FIG. 3). By this control, the DC-to-DC converter 130 is driven (at t4, (f) of FIG. 3) and electric power is supplied from the high-voltage battery 110 to the second auxiliary load 170. In the present embodiment, no electric power for charging is supplied from the DC-to-DC converter 130 to the auxiliary battery 140. Therefore, driving of the DC-to-DC converter 130 eliminates the discharge current flowing out of the auxiliary battery 140 (at t4, continuous line in (g) of FIG. 3). The first control ends when the DC-to-DC converter 130 is driven.

Step S207

The operation control unit 210 requests to drive the high-voltage system control device 300. This request can be made by outputting a drive request signal to the high-voltage system control device 300. In response to this request, driving of the high-voltage system control device 300 is started and the high-voltage main relay 120 is switched to the connected state, namely an electrically conductive state (at t3, (d) of FIG. 3). Driving of the high-voltage system control device 300 causes a discharge current that flows out of the auxiliary battery 140 (at t3 to t4, dashed line in (g) of FIG. 3). When driving of the high-voltage system control device 300 is requested, the routine proceeds to step S208.

Step S208

The operation control unit 210 determines whether driving of the high-voltage system control device 300 is completed. This determination can be made by receiving a drive completion signal returned from the high-voltage system control device 300 in response to the drive request signal. When driving of the high-voltage system control device 300 is completed (step S208, YES), the routine proceeds to step S209. Otherwise (step S208, NO), step S208 is repeated.

Step S209

The operation control unit 210 instructs to drive the DC-to-DC converter (DDC) 130. Specifically, the operation control unit 210 outputs to the DC-to-DC converter 130 a drive signal with a set voltage instruction value that allows supply of electric power to the second auxiliary load 170 (at t4, (e) of FIG. 3). In the present embodiment, no electric power for charging is supplied from the DC-to-DC converter 130 to the auxiliary battery 140. When it is instructed to drive the DC-to-DC converter 130, the routine proceeds to step S210.

Step S210

The operation control unit 210 determines whether driving of the DC-to-DC converter 130 is completed. This determination is made in order to avoid the second auxiliary load 170 being driven before driving of the DC-to-DC converter 130 is completed. As driving of the DC-to-DC converter 130 is completed (at t4, (f) of FIG. 3), electric power is supplied from the high-voltage battery 110 to the second auxiliary load 170. In the present embodiment, since no electric power for charging is supplied from the DC-to-DC converter 130 to the auxiliary battery 140, driving of the DC-to-DC converter 130 eliminates the discharge current flowing out of the auxiliary battery 140 (at t4, dashed line in (g) of FIG. 3). When driving of the DC-to-DC converter 130 is completed, the routine proceeds to step S211.

Step S211

The operation control unit 210 requests to drive the second auxiliary load 170. This request can be made by outputting a drive request signal to the second auxiliary load 170. Driving of the second auxiliary load 170 is started in response to this request (at t5, dashed line in (c) of FIG. 3). The first control ends when driving of the second auxiliary load 170 is requested.

As described above, in the first control, in the case where the vehicle is in the non-started on-board state in which a user is presumed to be on board and the ignition is off, the second auxiliary load 170 is preferentially driven (steps S203 to S206) when the state of charge (SOC) of the auxiliary battery 140 is equal to or higher than the first threshold, and the DC-to-DC converter 130 is preferentially driven over the second auxiliary load 170 (S207 to S211) when the state of charge (SOC) of the auxiliary battery 140 is lower than the first threshold. As described above, when the state of charge of the auxiliary battery 140 is not high enough to drive the second auxiliary load 170, driving of the second auxiliary load 170 is started after the high-voltage battery 110 is caused to supply electric power. The second auxiliary load 170 can thus be driven reliably.

In the process flow of steps S203 to S206, the high-voltage system control device 300 is driven after the second auxiliary load 170 is driven. However, since the state of charge of the auxiliary battery 140 is high enough, the second auxiliary load 170 and the high-voltage system control device 300 may be driven at the same time.

(2) Second Control

Figure 4:
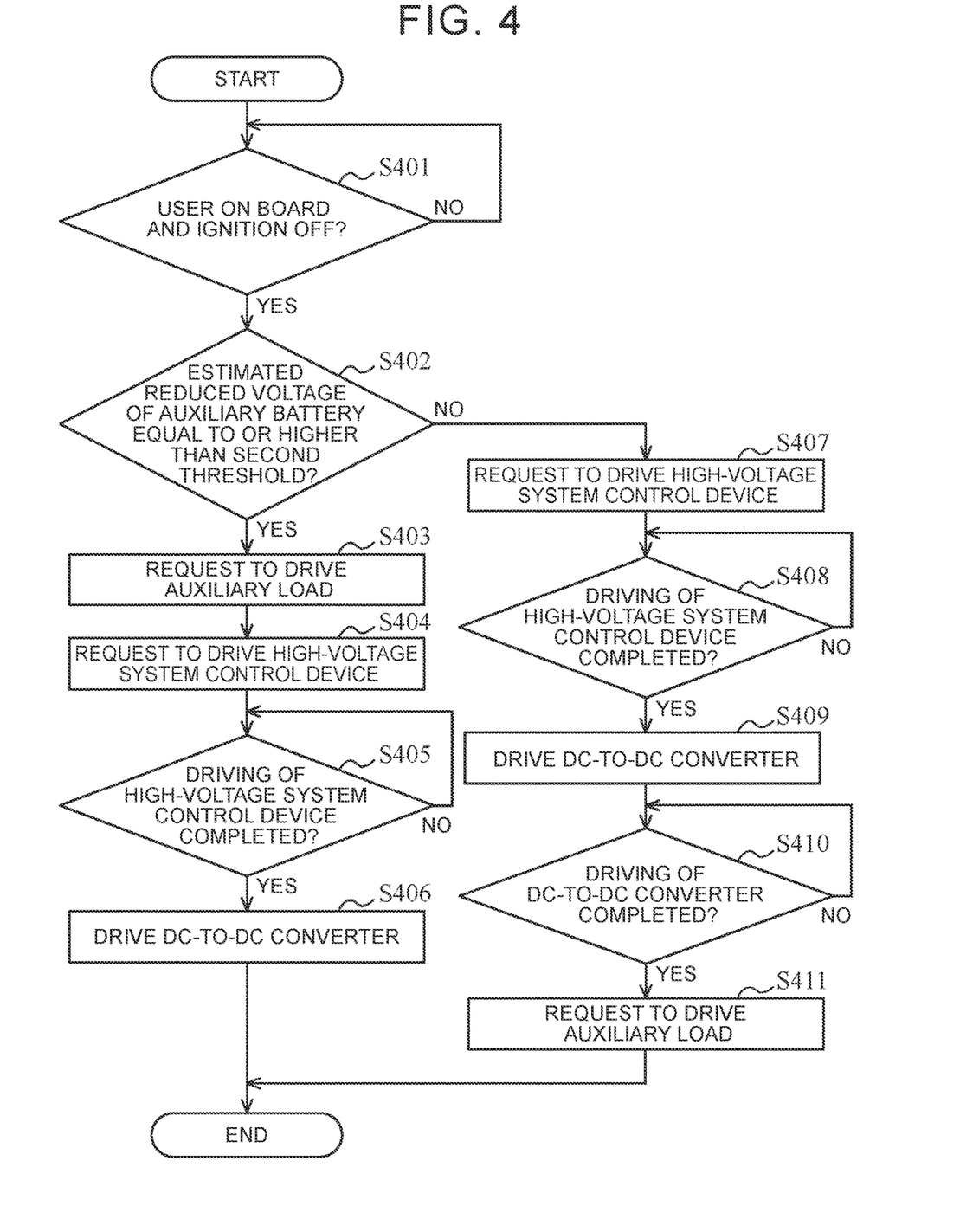
FIG. 4 is a flowchart of a process of second control that is performed by each configuration of the vehicle control device.
Figure 5:
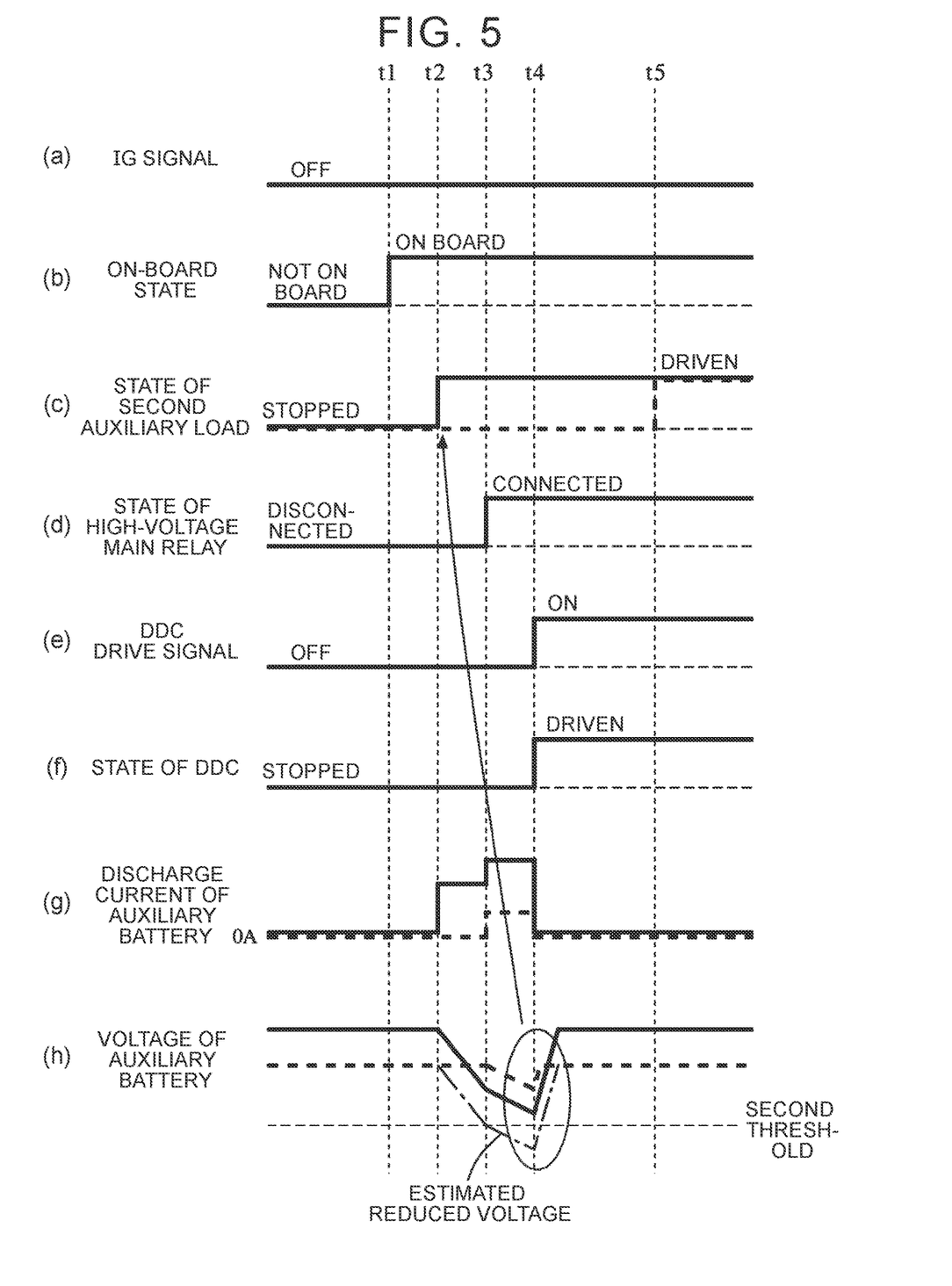
FIG. 5 illustrates an example of the operation timing based on the second control when an occupants gets in a vehicle.

FIG. 4 is a flowchart of a process of the second control that is performed by each configuration of the vehicle control device 200. FIG. 5 illustrates an example of the operation timing of each configuration based on the second control. FIG. 5 is an example when a user gets in the vehicle and illustrates control that is performed in the case where the user does not turn on the ignition of the vehicle immediately after he or she gets into the vehicle with the ignition off.

Step S401

The determination unit 220 determines whether a user is presumed to be on board and whether the ignition is off (non-started on-board state). When a user gets in the vehicle, it can be presumed that the user is on board when a series of door operations is performed in which a vehicle door is opened and then closed after the vehicle door is unlocked. It can be checked that the ignition is off by the presence or absence of the IG-ON signal. When the vehicle is in the non-started on-board state in which a user is presumed to be on board and the ignition is off (step S401, YES), the routine proceeds to step S402. Otherwise (step S401, NO), step S401 is repeated.

Step S402

The acquisition unit 230 determines whether the estimated reduced voltage of the auxiliary battery 140 derived from the voltage value, current value, and temperature value of the auxiliary battery 140 received from the battery sensor 150 is equal to or higher than a second threshold. The estimated reduced voltage is a reduced voltage value of the auxiliary battery 140 that is estimated to result from a discharge current when a current (estimated current consumption) estimated to be consumed by the second auxiliary load 170 during a first period in which a user is presumed to be on board and the ignition is off (non-started on-board state) is supplied by the auxiliary battery 140 alone. The first period is a period in which a current to be consumed by the second auxiliary load 170 is supplied by the auxiliary battery 140 alone and is a period from when it is determined that the vehicle is in the non-started on-board state until the DC-to-DC converter 130 is driven by the high-voltage system control device 300 according to a normal processing sequence.

Specifically, the estimated reduced voltage Vb_est of the auxiliary battery 140 is calculated by the following equation (1), where Vb_now represents a current voltage of the auxiliary battery 140 acquired from the battery sensor 150, Rb represents the internal resistance of the auxiliary battery 140, and IL represents the estimated current consumption of the second auxiliary load 170 in the first period. The internal resistance Rb of the auxiliary battery 140 can be obtained from a predetermined internal resistance map associated with the state of charge (SOC) of the auxiliary battery 140 and the temperature of the auxiliary battery 140. The internal resistance map need only be stored in advance in a memory (not shown) etc. by the vehicle control device 200.

$$Vb\_est = Vb\_now - (Rb \times IL) \qquad (1)$$

Therefore, the second threshold is set based on not only the voltage required to drive the second auxiliary load 170 but also the voltage required to operate the vehicle control device 200, the DC-to-DC converter 130, the high-voltage system control device 300, and the high-voltage main relay 120. More specifically, the second threshold is set to any desired value that allows the voltage of the auxiliary battery 140 to be equal to or higher than the voltage required for the operation of the second auxiliary load 170 and for the operation of the vehicle control device 200, the DC-to-DC converter 130, the high-voltage system control device 300, and the high-voltage main relay 120 until the DC-to-DC converter 130 is driven and electric power is supplied from the high-voltage battery 110 to the second auxiliary load 170.

When the estimated reduced voltage of the auxiliary battery 140 is equal to or higher than the second threshold (at t1: it is estimated to be higher than the second threshold at t4, continuous line in (h) of FIG. 5) (step S402, YES), the routine proceeds to step S403. On the other hand, when the estimated reduced voltage of the auxiliary battery 140 is lower than the second threshold (at t1: it is estimated to be lower than the second threshold at t4 (long dashed short dashed line in the conventional control), dashed line in (h) of FIG. 5) (step S402, NO), the process proceeds to step S407.

Step S403

The operation control unit 210 requests to drive the second auxiliary load 170. This request can be made by outputting a drive request signal to the second auxiliary load 170. Driving of the second auxiliary load 170 is started in response to this request (at t2, continuous line in (c) of FIG. 5). Driving of the second auxiliary load 170 causes a discharge current that flows out of the auxiliary battery 140 and therefore the voltage of the auxiliary battery 140 is reduced (at t2 to t3, continuous line in (g) and (h) of FIG. 5). When driving of the second auxiliary load 170 is requested, the routine proceeds to step S404.

Step S404

The operation control unit 210 requests to drive the high-voltage system control device 300. This request can be made by outputting a drive request signal to the high-voltage system control device 300. In response to this request, driving of the high-voltage system control device 300 is started and the high-voltage main relay 120 is switched to the connected state, namely an electrically conductive state (at t3, (d) of FIG. 5). Driving of the high-voltage system control device 300 increases the discharge current flowing out of the auxiliary battery 140 and the voltage of the auxiliary battery 140 is further reduced (at t3 to t4, continuous line in (g) and (h) of FIG. 5). When driving of the high-voltage system control device 300 is requested, the routine proceeds to step S405.

Step S405

The operation control unit 210 determines whether driving of the high-voltage system control device 300 is completed. This determination can be made by receiving a drive completion signal returned from the high-voltage system control device 300 in response to the drive request signal. When driving of the high-voltage system control device 300 is completed (step S405, YES), the routine proceeds to step S406. Otherwise (step S405, NO), step S405 is repeated.

Step S406

The operation control unit 210 drives the DC-to-DC converter (DDC) 130. Specifically, the operation control unit 210 outputs to the DC-to-DC converter 130 a drive signal with a set voltage instruction value that allows supply of electric power to the second auxiliary load 170 (at t4, (e) of FIG. 5). By this control, the DC-to-DC converter 130 is driven (at t4, (f) of FIG. 5) and electric power is supplied from the high-voltage battery 110 to the second auxiliary load 170. In the present embodiment, no electric power for charging is supplied from the DC-to-DC converter 130 to the auxiliary battery 140. Driving of the DC-to-DC converter 130 eliminates the discharge current flowing out of the auxiliary battery 140 and the voltage of the auxiliary battery 140 is gradually restored (at and after t4, continuous line in (g) and (h) of FIG. 5). The second control ends when the DC-to-DC converter 130 is driven.

Step S407

The operation control unit 210 requests to drive the high-voltage system control device 300. This request can be made by outputting a drive request signal to the high-voltage system control device 300. In response to this request, driving of the high-voltage system control device 300 is started and the high-voltage main relay 120 is switched to the connected state, namely an electrically conductive state (at t3, (d) of FIG. 5). Driving of the high-voltage system control device 300 causes a discharge current that flows out of the auxiliary battery 140 and therefore the voltage of the auxiliary battery 140 is reduced (at t3 to t4, dashed line in (g) and (h) of FIG. 5). When driving of the high-voltage system control device 300 is requested, the routine proceeds to step S408.

Step S408

The operation control unit 210 determines whether driving of the high-voltage system control device 300 is completed. This determination can be made by receiving a drive completion signal returned from the high-voltage system control device 300 in response to the drive request signal. When driving of the high-voltage system control device 300 is completed (step S408, YES), the routine proceeds to step S409. Otherwise (step S408, NO), step S408 is repeated.

Step S409

The operation control unit 210 instructs to drive the DC-to-DC converter (DDC) 130. Specifically, the operation control unit 210 outputs to the DC-to-DC converter 130 a drive signal with a set voltage instruction value that allows supply of electric power to the second auxiliary load 170 (at t4, (e) of FIG. 5). In the present embodiment, no electric power for charging is supplied from the DC-to-DC converter 130 to the auxiliary battery 140. When it is instructed to drive the DC-to-DC converter 130, the routine proceeds to step S410.

Step S410

The operation control unit 210 determines whether driving of the DC-to-DC converter 130 is completed. This determination is made in order to avoid the second auxiliary load 170 being driven before driving of the DC-to-DC converter 130 is completed. As driving of the DC-to-DC converter 130 is completed (at t4, (f) of FIG. 5), electric power is supplied from the high-voltage battery 110 to the second auxiliary load 170. In the present embodiment, since no electric power for charging is supplied from the DC-to-DC converter 130 to the auxiliary battery 140, driving of the DC-to-DC converter 130 eliminates the discharge current flowing out of the auxiliary battery 140 and the voltage of the auxiliary battery 140 is gradually restored (at and after t4, dashed line in (g) and (h) of FIG. 5). When driving of the DC-to-DC converter 130 is completed, the routine proceeds to step S411.

Step S411

The operation control unit 210 requests to drive the second auxiliary load 170. This request can be made by outputting a drive request signal to the second auxiliary load 170. Driving of the second auxiliary load 170 is started in response to this request (at t5, dashed line in (c) of FIG. 5). Since electric power to be consumed by the second auxiliary load 170 is supplied from the high-voltage battery 110, the voltage of the auxiliary battery 140 does not decrease. The second control ends when driving of the second auxiliary load 170 is requested.

As described above, in the second control, in the case where the vehicle is in the non-started on-board state in which a user is presumed to be on board and the ignition is off, the second auxiliary load 170 is preferentially driven (steps S403 to S406) when the estimated reduced voltage of the auxiliary battery 140 in the first period is equal to or higher than the second threshold, and the DC-to-DC converter 130 is preferentially driven over the second auxiliary load 170 (S407 to S411) when the estimated reduced voltage of the auxiliary battery 140 in the first period is lower than the second threshold. As described above, when the estimated reduced voltage of the auxiliary battery 140 cannot be kept at a voltage value required to operate each configuration in the future, driving of the second auxiliary load 170 is started after the high-voltage battery 110 is caused to supply electric power. The second auxiliary load 170 can thus be driven reliably.

In the second control, whether driving of the second auxiliary load 170 is performed preferentially or delayed can be determined by directly comparing the voltage drop calculated based on the estimated current consumption of the second auxiliary load 170 in the first period with a current voltage of the auxiliary battery 140. Accordingly, whether driving of the second auxiliary load 170 is performed preferentially or delayed can be more accurately determined than in the first control in which this determination is made based on the state of charge of the auxiliary battery 140.

In the process flow of steps S403 to S406, the high-voltage system control device 300 is driven after the second auxiliary load 170 is driven. However, since the voltage of the auxiliary battery 140 is high enough even in view of the voltage drop, the second auxiliary load 170 and the high-voltage system control device 300 may be driven at the same time.

Operations and Effects

As described above, according to the vehicle control device 200 of the present embodiment, when it is determined that a user is presumed to be on board and the ignition of the vehicle is off, the high-voltage system control device 300, the high-voltage main relay 120, and the DC-to-DC converter 130 are preferentially driven over the second auxiliary load 170 unless the state of charge (SOC) or estimated reduced voltage of the auxiliary battery 140 is equal to or higher than a predetermined threshold required to drive the second auxiliary load 170.

By this control, electric power that is supplied to drive the second auxiliary load 170 can be provided by the high-voltage battery 110 via the DC-to-DC converter 130. The second auxiliary load 170 can therefore be driven reliably.

Although one embodiment of the present disclosure has been described above, the present disclosure can be construed as a vehicle control device, a control method that is performed by the vehicle control device, a control program, a computer-readable non-transitory storage medium having the control program stored therein, or a vehicle equipped with the vehicle control device.

The vehicle control device etc. of the present disclosure can be used in electrically powered vehicles equipped with a high-voltage battery for traction of the vehicle, such as hybrid vehicles (HVs), plug-in hybrid vehicles (PHVs), and electric vehicles (EVs).

What is claimed is:

1. A vehicle control device that is mounted on a vehicle, the vehicle including a first battery, a second battery, an auxiliary load that is powered by the second battery, and a DC-to-DC converter configured to supply electric power from the first battery to either the second battery or the auxiliary load, or to both of the second battery and the auxiliary load, the vehicle control device comprising a processor configured to:
   control operation of the DC-to-DC converter and operation of the auxiliary load;
   determine a state of a start switch of the vehicle and a boarding state of the vehicle;
   acquire a voltage of the second battery; and
   when the processor determines that the vehicle is in a non-started on-board state, determine based on the voltage of the second battery an order in which the DC-to-DC converter and the auxiliary load are driven, the non-started on-board state being a state in which the start switch is off and a user is presumed to be in the vehicle,
   wherein the processor is further configured to:
      derive a state of charge of the second battery based on the voltage of the second battery, and
      in the non-started on-board state, drive the auxiliary load and then drive the DC-to-DC converter when the state of charge is equal to or higher than a first threshold, and drive the DC-to-DC converter and then drive the auxiliary load when the state of charge is lower than the first threshold.

2. The vehicle control device according to claim 1, wherein the processor is configured to:
   derive internal resistance of the second battery based on the voltage of the second battery and a temperature of the second battery;
   derive an estimated reduced voltage based on the voltage of the second battery, the internal resistance of the second battery, and estimated current consumption of the auxiliary load, the estimated reduced voltage being a voltage of the second battery after a first period in the non-started on-board state, and the estimated current consumption being a current estimated to be consumed by the auxiliary load during the first period in the non-started on-board state; and
   in the non-started on-board state, drive the auxiliary load and then drive the DC-to-DC converter when the estimated reduced voltage is equal to or higher than a second threshold, and drive the DC-to-DC converter and then drive the auxiliary load when the estimated reduced voltage is lower than the second threshold.

3. The vehicle control device according to claim 2, wherein the processor is configured to derive the internal resistance of the second battery based on both the state of charge of the second battery obtained based on the voltage of the second battery and the temperature of the second battery.

4. The vehicle control device according to claim 2, wherein the processor is configured to derive the estimated reduced voltage by subtracting a voltage drop from the voltage of the second battery immediately after the processor determines that the vehicle is in the non-started on-board state, the voltage drop being calculated by multiplying the internal resistance of the second battery and the estimated current consumption.

5. The vehicle control device according to claim 1, wherein the processor is configured to control a relay to a connected state before driving the DC-to-DC converter, the relay being configured to switch an electrical conduction state between the first battery and the DC-to-DC converter.

6. A vehicle equipped with the vehicle control device according to claim 1.

7. A control method that is performed by a computer of a vehicle control device mounted on a vehicle, the vehicle including a first battery, a second battery, an auxiliary load that is powered by the second battery, and a DC-to-DC converter configured to supply electric power from the first battery to either the second battery or the auxiliary load, or to both of the second battery and the auxiliary load, the control method comprising:
   determining a state of a start switch of the vehicle and a boarding state of the vehicle;
   acquiring a voltage of the second battery; and
   when determination is made that the vehicle is in a non-started on-board state, determining based on the voltage of the second battery an order in which the DC-to-DC converter and the auxiliary load are driven, the non-started on-board state being a state in which the start switch is off and a user is presumed to be in the vehicle,
   wherein the computer is further configured to:
      derive a state of charge of the second battery based on the voltage of the second battery, and
      in the non-started on-board state, drive the auxiliary load and then drive the DC-to-DC converter when the state of charge is equal to or higher than a first threshold, and drive the DC-to-DC converter and then drive the auxiliary load when the state of charge is lower than the first threshold.

8. A non-transitory storage medium storing instructions that are executable by a processor of a vehicle control device mounted on a vehicle and that cause the processor to perform functions, the vehicle including a first battery, a second battery, an auxiliary load that is powered by the second battery, and a DC-to-DC converter configured to supply electric power from the first battery to either the second battery or the auxiliary load, or to both of the second battery and the auxiliary load, the functions comprising:
   determining a state of a start switch of the vehicle and a boarding state of the vehicle;
   acquiring a voltage of the second battery; and
   when determination is made that the vehicle is in a non-started on-board state, determining based on the voltage of the second battery an order in which the DC-to-DC converter and the auxiliary load are driven, the non-started on-board state being a state in which the start switch is off and a user is presumed to be in the vehicle,
   wherein the processor is further configured to:
      derive a state of charge of the second battery based on the voltage of the second battery, and
      in the non-started on-board state, drive the auxiliary load and then drive the DC-to-DC converter when the state of charge is equal to or higher than a first threshold, and drive the DC-to-DC converter and then drive the auxiliary load when the state of charge is lower than the first threshold.

* * * * *